Feb. 5, 1957 B. J. FONTANA 2,780,517
SEPARATION OF URANIUM FROM FOREIGN SUBSTANCES
Filed April 27, 1943
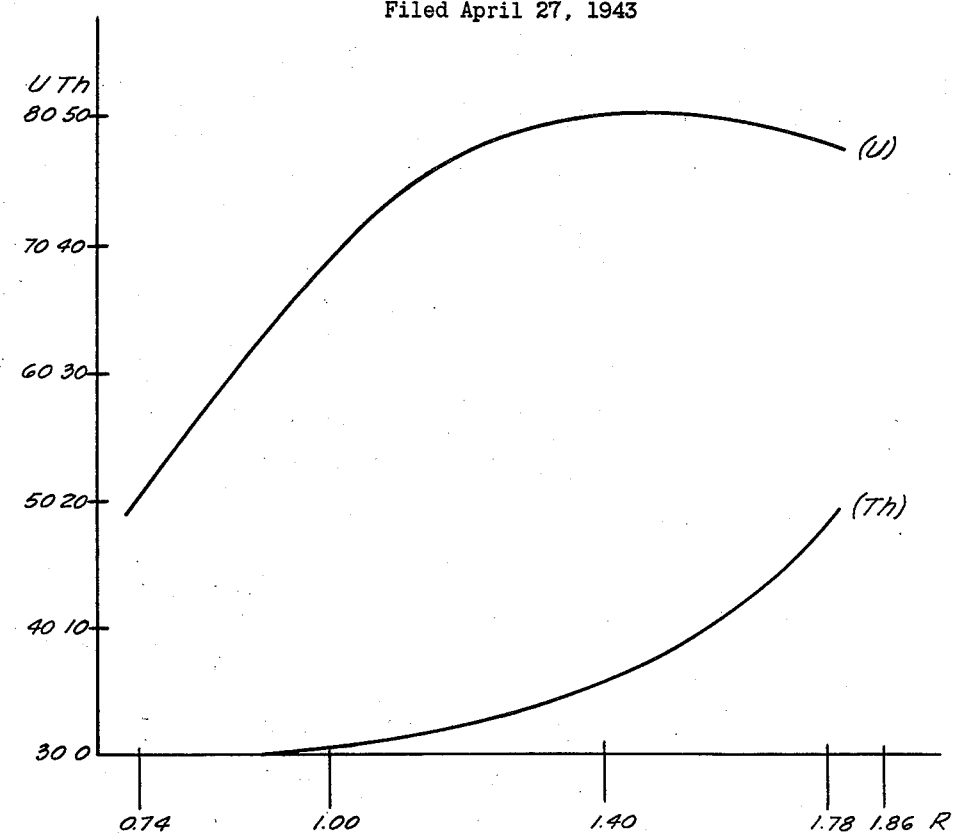
Beppino J. Fontana INVENTOR.

United States Patent Office 2,780,517
Patented Feb. 5, 1957

2,780,517

SEPARATION OF URANIUM FROM FOREIGN SUBSTANCES

Beppino J. Fontana, Berkeley, Calif., assignor to the United States of America as represented by the United States Atomic Energy Commission Application April 27, 1943, Serial No. 484,680

5 Claims. (Cl. 23—14.5)

The invention relates to the extraction of uranium and has for its principal object the separation of $U^{233}$ from thorium and protoactinium in neutron irradiated thorium compositions in which thorium is present in major amounts and $Pa^{233}$ and $U^{233}$ are present in very minor amounts.

The reaction of slow neutrons with $Th^{232}$ produces $Th^{233}$ which decays with a half life of 23.5 minutes to $Pa^{233}$ which in turn decays with a half life of 27.4 days to $U^{233}$. The neutrons for this reaction may be obtained from any neutron source, such as from the reaction of deuterons on beryllium, but where the neutrons produced have energies of above 1 million electron volts it is advisable to slow the neutrons to below this energy, since the reaction of fast neutrons with $Th^{232}$ results almost entirely in the production of fission products. The neutrons may be slowed by interposing hydrogen-containing, carbon-containing or other neutron slowing material between the thorium and the fast neutron source. The concentration of $U^{233}$ in the reaction mass produced by the reaction of neutrons on thorium is low even when a high intensity source of neutrons is used and the reaction run for a long period of time. Under ordinary conditions of operation when the concentration of $U^{233}$ reaches about 1%, the $U^{233}$ is consumed at the same rate it is formed by its reaction with neutrons to produce fission products, so that about 1% may be considered to be the upper limit at which $U^{233}$ will normally be present in neutron irradiated thorium. A small amount of $Pa^{233}$ will also be present which has not decayed to $U^{233}$ during the reaction and if the reaction mass is stored for several months before separating, the amount of $U^{233}$ may be slightly increased. However, in practice, concentrations of above about 1 to 2% will not ordinarily be attained in view of the neutron intensities that are available and in general concentrations of uranium in the thorium of below about 0.1% will be present. It therefore became an object of the present invention to provide a method for recovering uranium which is present in minute amount with large quantities of thorium.

This object was accomplished by me in a simple manner by a method in which, so far as I can see, there was no a priori reason to expect success.

My method, in its broadest aspect, is an ether extraction of the uranium as uranyl nitrate from an aqueous solution of the nitrates of thorium and uranium. So far as I know it had hitherto been believed that uranyl nitrate could not be extracted by ether from compositions in which it was present in small amounts, although extraction of uranyl nitrate from various water soluble nitrates when the uranium was present in high concentration, such as 20%, was known and had been described.

In accordance with one embodiment of the invention, thorium hydroxide is bombarded with neutrons, the majority of which have energies of below 1 m. e. v., and the neutrons allowed to react with the thorium until the concentration of $U^{233}$ in the thorium is between about .001 of 1% and 1% by weight. The neutron irradiated thorium mass is then treated with nitric acid to form thorium nitrate, uranium nitrate, and nitrates of other materials present in the mass. The nitrates are dissolved in water and the aqueous solution agitated with ether, whereupon the ether preferentially extracts the uranium from the thorium and protoactinium in the solution.

Instead of using thorium hydroxide, thorium metal and thorium sulphate, or other compounds of thorium which may be converted to thorium nitrate, may be irradiated with neutrons and uranium recovered by an ether extraction as above described. Thorium hydroxide, however, is preferred because it is readily converted to thorium nitrate and also because the hydroxide has the advantage of providing hydrogen atoms in admixture with the thorium atoms for slowing down the neutrons before absorption in the thorium.

Thorium sulphate also has advantages over compounds such as thorium oxide and thorium fluoride in that it can be easily converted to hydroxide and then to nitrate and also because there are three different sulphate salts with different degrees of hydration which, because of their contained hydrogen atoms, may advantageously be used for slowing down neutrons.

In a preferred embodiment of the invention, the ether extraction is carried out on an aqueous solution in which the ratio by weight of $Th(NO_3)_4$ to water is so regulated that it is in the range of about .7 to 1.4. At above a ratio of 1.4 the percentage of Th in the ether increases without further increase of uranium which is at its maximum of about 80%.

The optimum ratio of $Th(NO_3)_4$ to water is about 1. At this ratio the extraction of thorium by the ether is less than 0.5% and the extraction of uranium is about 70% with one extraction using equal volumes of the ether and water phase.

The critical weight ratios noted above are based on extractions using 25 grams of $Th(NO_3)_4 \cdot 4H_2O$ and amounts of U ranging from tracer amounts to 50 mg. All experiments were performed at room temperature (abut 20° C.). The required amount of water was added to produce the desired ratio of $Th(NO_3)_4$ to $H_2O$, taking into account the water already present as water of hydration in the Th salt. This aqueous solution was then shaken with ether for about 10–15 minutes.

The calculated average partition coefficients, with the observed average deviation, for U and Th are tabulated below in Table I as a function of the initial weight ratio, R, of $Th(NO_3)_4$ to $H_2O$. The partition coefficient $k$ is the ratio of concentration in the water layer to concentration in the ether layer, and hence becomes smaller in magnitude as the recovery in the ether phase increases. As a corollary of this, it follows that the separation between the two components U and Th that is afforded by the herein described step of ether extraction, as distinguished from the mere recovery of the respective components in the ether phase, becomes more effective not only as $k_u$ decreases but also as $k_{th}$ increases. The corresponding normality, N, of the initial $Th(NO_3)_4$ solution is also given as total equivalents per liter of $Th(NO_3)_4$.

Table I

| R | N | $k_u$ | $k_{th}$ |
|---|---|---|---|
| 0.74 | 5.32 | 1.1±0.2 | 1620±220 |
| 1.00 | 6.84 | 0.5±0.13 | 243±18 |
| 1.40 | 9.04 | 0.26±0.03 | 25±5 |
| 1.78 | 10.80 | 0.36±0.07 | 5.2±0.3 |

The invention may more readily be understood by referring to Figure 1 of the drawing in which the percentage of uranium and thorium in the ether phase is plotted against R, the weight ratio of thorium nitrate to water.

Figure 1 reveals immediately that in going from $R=0.74$ to 1.78 the recovery of U rises rapidly from about 50% at $R=0.74$ to a maximum of about 80% at $R=1.40$, the recovery then leveling off at 80% or perhaps even dropping slightly as $R=1.78$ is reached. The Th recovery concurrently rises steadily, a relatively enormous increase occurring, from less than 0.1% at $R=0.74$ to about 20% at $R=1.78$. The region of optimum recovery for uranium is at $R=$ approximately 1.0 where less than 0.5% of the Th is extracted and about 70% of the U is obtained in one extraction with equal volumes of the two phases. The U partition coefficient, it should be noted, is apparently independent of the number of extractions performed, of the ratio of volumes of the two phases, and of the concentration of uranium. In some of the extractions performed the U varied from a total of about 50 mg. of U to tracer amounts (probably less than 1 microgram) all in the presence of 10,500 mg. of Th.

It was thought necessary to determine the effect of $HNO_3$ on this system since $Th(NO_3)_4$ as such is not likely to be used in the original preparation of the $U^{233}$ by neutron bombardment. If, for example, a wet hydroxide of Th is used, this would have to be converted to the nitrate before the extraction method of the present invention could be used. It is obviously desirable then to know whether the excess $HNO_3$ used in the conversion needs to be removed or not. The effect of the presence of $HNO_3$ in the $Th(NO_3)_4$ solution undergoing the ether extraction step is shown below in Table II, in which the various symbols have the same meanings as before, except that N here refers to the normality of the initial $Th(NO_3)_4$ solution expressed as total equivalents per liter of $$Th(NO_3)_4 + HNO_3$$

From the values given in this table, the interesting result is noted that the recovery of the U in the ether phase in the presence of $HNO_3$ is at least as great as in the absence of $HNO_3$, at least for relatively small concentrations of $HNO_3$. However, the presence of $HNO_3$ is undesirable because of the simultaneously greatly increased Th recovery in the ether phase. In other words, the effectiveness of separation of the two mentioned components is reduced by the presence of $HNO_3$ in the $Th(NO_3)_4$ solution that is subjected to the ether extraction step, the reduction in effectiveness of the separation apparently being dependent upon the initial concentration of $HNO_3$ present therein. Under these circumstances it is preferred to remove the excess $HNO_3$ used in the conversion of the composition to the nitrate, although it will be understood that it is within the spirit of the invention not to do so when the excess $HNO_3$ is not sufficient to render the resulting $Th(NO_3)_4$ solution of too great a normality with respect to $HNO_3$.

*Table II*

| R | N | $k_u$ | $k_{th}$ |
|---|---|---|---|
| 0.74 (2 N in $HNO_3$) | 7.32 | 0.4 | 14±0 |
| 0.74 (6 N in $HNO_3$) | 11.32 | 4.0 | 3.6 |

While there has been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible, in view of the prior art.

I claim:

1. The method of separating uranium from thorium in compositions containing a large proportion of thorium nitrate and minute proportion of uranium nitrate which comprises forming an aqueous solution of said composition, regulating the ratio by weight of the thorium nitrate in said composition to water to between .7 and 1.4, and extracting the uranium nitrate from the composition with ether.

2. The method of separating uranium from thorium in compositions containing a large proportion of thorium nitrate and minute proportion of uranium nitrate which comprises regulating the ratio by weight of thorium nitrate in said composition to water to approximately 1., and extracting the uranium nitrate from the composition with ether. 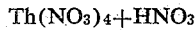

3. In a process for producing uranium 233, the steps comprising irradiating a thorium containing material with slow neutrons to produce uranium 233 therein treating said material with nitric acid to convert at least the thorium and uranium 233 therein into nitrates, forming an aqueous solution of said nitrates wherein the ratio by weight of thorium nitrate to water is in the range of .7 to 1.4, and contacting said solution with ether to extract the uranium 233 away from thorium which remains in the solution.

4. In a process for producing uranium 233, the steps comprising irradiating a material selected from the group consisting of thorium hydroxides and hydrated thorium sulphates with neutrons to convert thorium to uranium 233 therein, treating the irradiated material with nitric acid to convert at least the thorium and uranium 233 therein into nitrates, forming an aqueous solution of said nitrates wherein the ratio by weight of thorium nitrate to water is in the range of .7 to 1.4, and contacting said solution with ether to extract the uranium 233 away from thorium which remains in the solution.

5. The process as defined in claim 4 but wherein said ratio of thorium nitrate to water in the solution is approximately 1.

References Cited in the file of this patent

Mellor: "Inorganic and Theoretical Chemistry," vol. IV, pages 119–120 (1923).

Lowry: "Inorganic Chemistry," second edition, page 1057, MacMillan & Co. (1931).

Misciatelli: "The System: Thorium Nitrate—Ether—Water between 0° and 20°." Chemical Abstracts, vol. 25, page 1453 (1931).

Hackh: "Chemical Dictionary," page 316, P. Blakiston's Son & Co., Philadelphia (1937).

Meitner et al.: Zeitschrift für Physik, vol. 109, pp. 538–552 (1938).